United States Patent
Ke

(10) Patent No.: US 9,723,084 B2
(45) Date of Patent: Aug. 1, 2017

(54) INTER-AGENT CROSS-BLADE-SERVER CALLING METHOD AND SYSTEM

(71) Applicant: ZTE Corporation, Shenzhen, Guangdong (CN)

(72) Inventor: Wenfeng Ke, Shenzhen (CN)

(73) Assignee: ZTE Corporation, Shenzhen, Guangdong (CN)

( * ) Notice: Subject to any disclaimer, the term of this patent is extended or adjusted under 35 U.S.C. 154(b) by 0 days.

(21) Appl. No.: 14/416,262

(22) PCT Filed: Jul. 26, 2013

(86) PCT No.: PCT/CN2013/080242
§ 371 (c)(1),
(2) Date: Jan. 21, 2015

(87) PCT Pub. No.: WO2013/170837
PCT Pub. Date: Nov. 21, 2013

(65) Prior Publication Data
US 2015/0244809 A1 Aug. 27, 2015

(30) Foreign Application Priority Data
Sep. 12, 2012 (CN) .......................... 2012 1 0336340

(51) Int. Cl.
*H04L 29/08* (2006.01)
*H04L 29/06* (2006.01)
(Continued)

(52) U.S. Cl.
CPC ........ *H04L 67/141* (2013.01); *H04L 65/1006* (2013.01); *H04L 65/1069* (2013.01);
(Continued)

(58) Field of Classification Search
CPC .... H04M 3/523; H04M 3/493; H04M 3/4211; H04M 1/006; H04M 2203/352;
(Continued)

(56) References Cited

U.S. PATENT DOCUMENTS 5,937,051 A * 8/1999 Hurd ................... H04M 3/5183
379/212.01
6,766,011 B1 7/2004 Fromm
(Continued)

FOREIGN PATENT DOCUMENTS

| CN | 101965015 A | 2/2011 |
| CN | 102037709 A | 4/2011 |

(Continued)

OTHER PUBLICATIONS

Supplementary European Search Report in European application No. 13790851.3, mailed on Jun. 19, 2015.
(Continued)

*Primary Examiner* — Uzma Alam
(74) *Attorney, Agent, or Firm* — Oppedahl Patent Law Firm LLC

(57) ABSTRACT

Disclosed is an inter-agent cross-blade-server calling method, and the method includes that: a source blade server where an agent initiating a call gets registered and logs in detects that a call between agents is an inter-agent cross-blade-server call; the source blade server indicates a target blade server to hand over a called agent to the source blade server to host the called agent; and a session between the agent initiating a call and the hosted called agent is generated at the source blade server. Also disclosed is an inter-agent cross-blade-server calling system, where the target blade server is configured to, according to an indication of the source blade server, hand over the called agent to the source blade server to host the called agent and return the
(Continued)

related registration and login information to the source blade server. By virtue of the disclosure, a complete inter-agent call can be rapidly and cooperatively performed in the case of cross-blade-servers, thus lowering difficulties in implementing an inter-agent cross-blade-server call.

6 Claims, 3 Drawing Sheets

(51) Int. Cl.
 *H04M 3/523* (2006.01)
 *H04M 7/00* (2006.01)
(52) U.S. Cl.
 CPC .......... *H04L 67/10* (2013.01); *H04M 3/5237* (2013.01); *H04M 7/006* (2013.01); *H04M 2203/406* (2013.01); *H04M 2203/6018* (2013.01)
(58) Field of Classification Search
 CPC ........... H04M 3/42042; H04M 3/5237; H04M 7/006; H04M 2203/406; H04M 2203/6018; H04L 67/141; H04L 65/1006; H04L 65/1069; H04L 67/10
 See application file for complete search history.

(56) References Cited

U.S. PATENT DOCUMENTS

| | | | | |
|---|---|---|---|---|
| 8,214,479 B2* | 7/2012 | Luessem | ............... | H04W 24/04 709/223 |
| 8,654,762 B2* | 2/2014 | Speks | ................. | G06F 11/2028 370/360 |
| 9,020,121 B1* | 4/2015 | Dhanda | .................. | H04M 3/42 379/127.06 |
| 9,025,592 B2* | 5/2015 | Speks | ................. | H04L 67/1008 370/360 |
| 2002/0161896 A1* | 10/2002 | Wen | .................... | H04L 12/1827 709/227 |
| 2003/0198332 A1* | 10/2003 | Fromm | ............... | H04M 3/5183 379/265.01 |
| 2003/0198333 A1 | 10/2003 | Fromm | | |
| 2003/0210777 A1 | 11/2003 | Fromm | | |
| 2004/0199568 A1* | 10/2004 | Lund | ....................... | H04L 69/40 709/201 |
| 2006/0010488 A1* | 1/2006 | Fujimori | ............. | H04L 41/0213 726/6 |
| 2006/0182255 A1* | 8/2006 | Luck | ....................... | H04M 3/12 379/220.01 |
| 2006/0294248 A1* | 12/2006 | Kershaw | ................. | H04L 67/34 709/228 |
| 2007/0101022 A1* | 5/2007 | Schulz | ................ | G06F 17/3089 709/244 |
| 2010/0262654 A1* | 10/2010 | Yang | ................... | H04M 7/0012 709/203 |
| 2011/0124342 A1* | 5/2011 | Speks | ................. | H04L 67/1008 455/445 |
| 2011/0134749 A1* | 6/2011 | Speks | ................. | G06F 11/2028 370/217 |
| 2011/0280391 A1* | 11/2011 | Venugopal | ............ | H04M 3/523 379/266.1 |
| 2012/0148040 A1* | 6/2012 | Desai | .................... | H04M 3/493 379/265.13 |
| 2014/0334618 A1* | 11/2014 | Tang | ................... | H04M 3/5141 379/265.09 |

FOREIGN PATENT DOCUMENTS

| | | |
|---|---|---|
| CN | 102047639 A | 5/2011 |
| CN | 102143149 A | 8/2011 |
| CN | 201995020 U | 9/2011 |
| CN | 102611809 A | 7/2012 |

OTHER PUBLICATIONS

International Search Report in international application No. PCT/CN2013/080242, mailed on Nov. 7, 2013.
English Translation of the Written Opinion of the International Search Authority in international application No. PCT/CN2013/080242, mailed on Nov. 7, 2013.

* cited by examiner

INTER-AGENT CROSS-BLADE-SERVER CALLING METHOD AND SYSTEM

TECHNICAL FIELD

The disclosure relates to cloud calling techniques, and in particular to an inter-agent cross-blade-server calling method and system.

BACKGROUND

A call centre is also referred to as a customer service centre, it is a comprehensive information service system integrated with enterprises, which is based on computer communication integration techniques and makes full use of integration of multiple functions of communication networks and computer networks, and it is also a specialized system for a group of agents or business representatives of a company to process centrally incoming calls and make calls so as to contact customers. The call centre, such as 10000 in the telecommunication industry and 95555 in the financial industry, can provide users with various services, such as call, fax, email and the like, which are mainly used to cope with requirements, complaints, suggestions and enquiries put forward by users to an enterprise.

As the rapid development of cloud computing techniques, a cloud call centre based on cloud computing arises, which has an increasingly wide application ranges, furthermore, typically features of the cloud call centre include its distributed nature, convenience to be expanded and separation of hardware from services, which make it possible for an agent to log in to any blade servers. The so-called blade server is one of many types of servers that include a tower server, a rack server and a blade server, and it refers to a server of which multiple cards can be inserted into a case having a standard height, and it also refers to a server, having high reliability, high density and low cost, designed in particularly for special applications and high-density computing environments. As indicated by its name, a blade server resembles a "blade", and each "blade" is actually one motherboard.

An agent can log in to any blade servers, a call can be initiated on any blade servers, and an inter-agent call is likely to cross over multiple different blade servers. Since memory information of multiple blade servers cannot be shared or used in common, that is to say, when an agent logs in to a blade server and gets registered there, then registration information of the agent will be stored in the blade server, and other blade servers where the agent does not log in or get registered cannot acquire the registration information of the agent, thus making information unable to be shared or used in common.

Existing techniques have a problem that information unification between multiple different blade servers cannot be ensured for an inter-agent call when the inter-agent call is an inter-agent cross-blade-server call since information cannot be shared or used in common between various blade servers, thereby resulting in great difficulties in performing cooperatively a complete call.

SUMMARY

In view of the above, embodiments of the disclosure are intended to provide an inter-agent cross-blade-server calling method and system which can perform rapidly and cooperatively a complete call between agents when the call crosses over blade servers and thus lower difficulties in implementing an inter-agent cross-blade-server call.

To this end, the technical solutions of embodiments of the disclosure are implemented as follows.

An inter-agent cross-blade-server calling method, including:

a source blade server where an agent initiating a call gets registered and logs in detects that a call between agents is an inter-agent cross-blade-server call;

the source blade server indicates a target blade server to hand over a called agent to the source blade server to host the called agent and return to the source blade server related registration and login information of the called agent at the target blade server; and a session between the agent initiating a call and the hosted called agent is generated at the source blade server.

In an embodiment, the generating at the source blade server a session between the agent initiating a call and the hosted called agent may include: the source blade server requests the target blade server to modify a state of the hosted agent on the target blade server to a hosted state.

In an embodiment, the generating at the source blade server a session between the agent initiating a call and the hosted called agent may further include: the source blade server initiates Session Initiation Protocol (SIP) signaling to correlate the session to the target blade server which then directs the session to an SIP terminal of the hosted agent.

In an embodiment, the detecting that a call between agents is an inter-agent cross-blade-server call may include: after receiving a call request message from the agent initiating a call, the source blade server detects that the call between agents is an inter-agent cross-blade-server call through parsing the call request message and learning that the call request message is a message to be transmitted to the target blade server.

In an embodiment, the returning to the source blade server related registration and login information of the called agent on the target blade server may include: in the meantime of indicating hosting, the source blade server transmits to the target blade server a information acquisition request message requesting acquisition of the related registration and login information of the called agent on the target blade server, and the target blade server returns the related registration and login information to the source blade server.

An inter-agent cross-blade-server calling system, including a source blade server and a target blade server, wherein the source blade server is configured to, as a blade server where an agent initiating a call gets registered and logs in, detect that a call between agents is an inter-agent cross-blade-server call, host a called agent, acquire related registration and login information of the called agent at the target blade server and generate a session between the agent initiating a call and the hosted called agent; and the target blade server is configured to, according to an indication of the source blade server, hand over the called agent to the source blade server to host the called agent and return the related registration and login information to the source blade server.

In an embodiment, the source blade server may be further configured to request the target blade server to modify a state of the hosted agent on the target blade server to a hosted state.

In an embodiment, the source blade server may be further configured to initiate Session Initiation Protocol (SIP) signaling to correlate the session to the target blade server which then directs the session to an SIP terminal of the hosted agent.

In an embodiment, the source blade server may include an agent hosting control unit configured to, after receiving a call request message from the agent initiating a call, detect that the call between agents is an inter-agent cross-blade-server call through parsing the call request message and learning that the call request message is a message to be transmitted to the target blade server.

In an embodiment, the agent hosting control unit may include a message parsing and processing sub-unit configured to parse the call request message and learn that the call request message is a message to be transmitted to the target blade server.

In embodiments of the disclosure, a source blade server where an agent initiating a call gets registered and logs in detects that a call between agents is an inter-agent cross-blade-server call; the source blade server indicates a target blade server to hand over a called agent to the source blade server to host the called agent and return to the source blade server related registration and login information of the called agent on the target blade server; and a session between the agent initiating a call and the hosted called agent is generated at the source blade server.

By means of embodiments of the disclosure, since information of an agent initiating a call and that of a called agent can be united in a same server through hosting the called agent in a source blade server where the agent initiating the call get registered and logs in, information sharing can be implemented, therefore performing rapidly and cooperatively a complete inter-agent call in the case of cross-blade-servers.

DETAILED DESCRIPTION

In embodiments of the disclosure, information of an agent initiating a call and information of a called agent can be united in a same server through hosting the called agent at a source blade server where the agent initiating the call gets registered and logs in, thus information sharing can be implemented.

Implementation of technical solutions will be further elaborated below with reference to the drawings.

Figure 1:
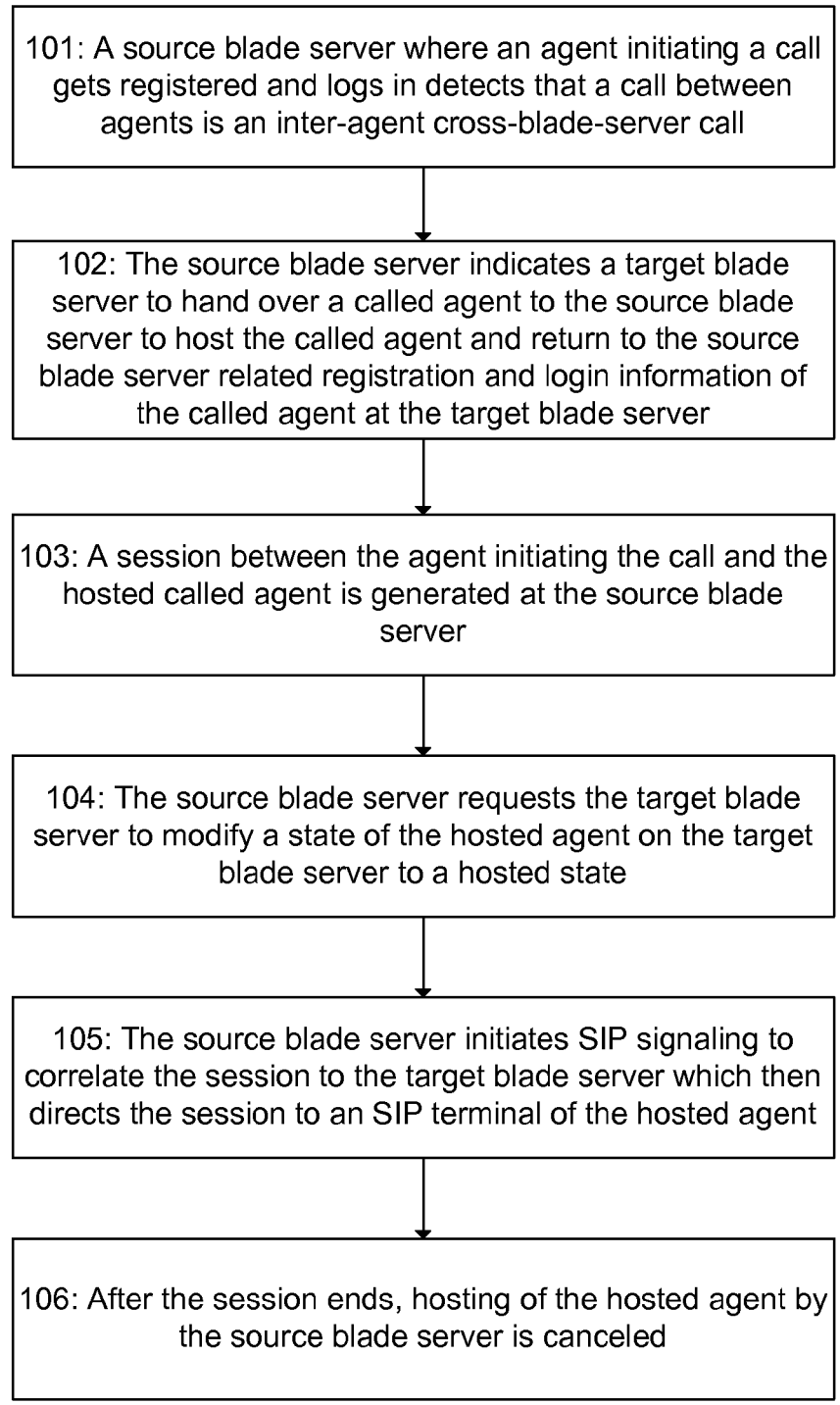
FIG. 1 is a flow chart of a method embodiment according to the disclosure.

As shown in FIG. 1, an inter-agent cross-blade-server calling method includes the following steps.

Step 101, a source blade server where an agent initiating a call gets registered and logs in detects that a call between agents is an inter-agent cross-blade-server call.

Herein, the source blade server is a blade server of an initiator of a call while the target blade server is a blade server of a recipient of the call.

Step 102, the source blade server indicates a target blade server to hand over a called agent to the source blade server to host the called agent, and return related registration and login information of the called agent in the target blade server to the source blade server. Specifically, the related registration and login information includes a badge number, a telephone number, a type, a registered IP and a port of an agent and other configuration information.

Herein, for the above steps 101 and 102, the detection in step 101 and the indication of hosting and information return in step 102 can both be implemented by an agent hosting control unit in the source blade server, specifically, since agents respectively log in to different blade servers, an agent serving as an initiator of a call request, also referred to as a primary agent, needs to call an agent at another blade server (also referred to as a called agent) by crossing over blade servers, the calling process is the same as that in prior art, which is calling directly an opposite side, i.e., a blade server where the called agent is located; however, since a calling agent and a called agent get registered and log in to different blade servers, a directly calling cannot be implemented, therefore it is desired to unify related registration and login information of the calling agent and that of the called agent at a same server i.e., the source blade server, so that the call can be implemented. To this end, after receiving a call request message from the calling agent, the source blade server, learns that the call request message is to be transmitted to another blade server, i.e., a called agent that gets registered and logs in to the target blade server, by parsing the message through the agent hosting control unit in the source blade server, then the source blade server, under the control of the agent hosting control unit, indicates the target blade server to hand over the called agent to the agent hosting control unit in the source blade server to host the called agent. In the meantime of indicating hosting, the source blade server, under the control of the agent hosting control unit, transmits an information acquisition request message to the target blade server, where the called agent was registered and logged in, to request acquisition of the related registration and login information of the called agent.

Step 103, a session between the agent initiating the call and the hosted called agent is generated at the source blade server.

Herein, a generated session is equivalent to a virtual session connection and is not actually dialed, and only related registration and login information of both the agent initiating the call and the called agent, which get registered and log in to different blade servers, is unified at a same blade server, i.e., the source blade server, so that information sharing is implemented. Only after information sharing is implemented, an actual SIP signaling session can be performed through step 105, thus implementing a call between the agent initiating the call and the called agent. That is to say, step 105 is equivalent to an actual session connection. Since the called agent gets an SIP link registered with a target blade server when it gets registered and logs in to the target blade server, though the called agent has been hosted by the source blade server, the target blade server where the called agent actually gets registered and logs in is still desired to be called directly, i.e., after a generation of a session between the agent initiating the call and the hosted called agent, an actual SIP signaling session can only be implemented by initiating SIP signaling to correlate the call to the target blade server through the source blade server.

Step 104, the source blade server requests the target blade server to modify a state of the hosted agent at the target blade server to a hosted state.

Herein, after the state is modified to the hosted state, the called agent cannot process any call request at a target blade server where it logs in, that is to say, all call requests are hosted by the source blade server to process.

Herein, after step 103 or 104, step 105 may also be included, where the source blade server initiates SIP signaling to correlate the session to the target blade server which directs the session to an SIP terminal of the hosted agent.

Step 106, after the session ends, hosting of the hosted agent by the source blade server is canceled Herein, that is to say, after a session for the hosted called agent ends, it still needs to cancel a hosting process of the called agent at the source blade server and to modify the state of the called agent at the target blade server to a host canceled state so as to facilitate subsequent inter-agent calls, otherwise, since all information is transferred to the source blade server so as to be hosted during the inter-agent call, an anomaly may occur when other calls are processed. For each call, the source blade server is desired to perform a detection to determine whether a hosting process is needed. In this way, an inter-agent cross-blade-server call can be implemented, the performance of a call is proportional to the quantity and performance of blade servers deployed, thus achieving cloud call capabilities that have nothing to do with hardware and are easy to be expanded.

It should be noted that, by analogy, in the case that a conference or monitoring is formed between multiple agents crossing over multiple blade severs, if multiple agents are all hosted by a source blade server that initiates a call request, the call seems to be performed at one blade server. For example, when a conference forms by sessions between multiple agents, an organizer of the conference initiates a call request to add, one by one, participants into the current conference, then a source blade server is a blade server where the organizer of the conference gets registered and logs in.

Figure 2:
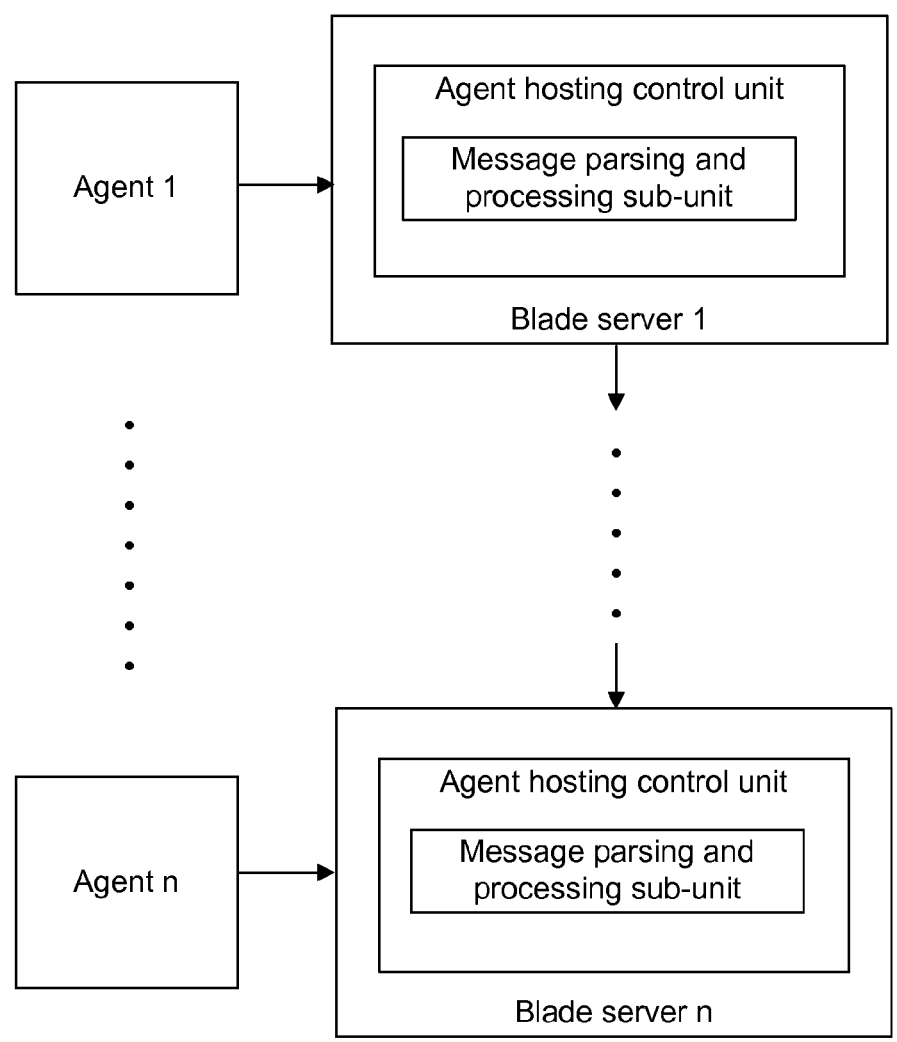
FIG. 2 is a schematic structural diagram of a system embodiment according to the disclosure.

As shown in FIG. 2, an inter-agent cross-blade-server calling system includes a source blade server and a target blade server. It should be noted that n blade servers in FIG. 2 may be a source blade server or a target blade server, the embodiment does not take into account specific call conditions and shows a system architecture diagram only, and if a blade server serves as an initiator of a call request, the blade server is a source blade server, accordingly, a recipient of the call request is a target blade server. Since any blade server may serve as a source blade server, each blade server in FIG. 2 includes an agent hosting control unit in which a message parsing and processing sub-unit is further included.

Specifically, the source blade server is configured to, as a blade server where an agent initiating a call gets registered and logs in, detect that a call between agents is an inter-agent cross-blade-server call, host a called agent, acquire related registration and login information of the called agent at the target blade server and generate a session between the agent initiating a call and the hosted called agent; and the target blade server is configured to, according to an indication of the source blade server, hand over the called agent to the source blade server to host the called agent, and return the related registration and login information to the source blade server.

Herein the source blade server is further configured to request the target blade server to modify a state of the hosted agent at the target blade server to a hosted state.

Herein the source blade server is further configured to initiate Session Initiation Protocol (SIP) signaling to correlate the session to the target blade server which directs the session to an SIP terminal of the hosted agent.

Herein the source blade server includes an agent hosting control unit configured to, after receiving a call request message from the agent initiating a call, detect that the call between agents is an inter-agent cross-blade-server call through parsing the call request message and learning that the call request message is a message to be transmitted to the target blade server.

Herein the agent hosting control unit may include a message parsing and processing sub-unit configured to parse the call request message and learn that the call request message is a message to be transmitted to the target blade server. The message parsing and processing sub-unit can be divided into two independent modules, i.e., a message parsing sub-unit and a message processing sub-unit.

Figure 3:
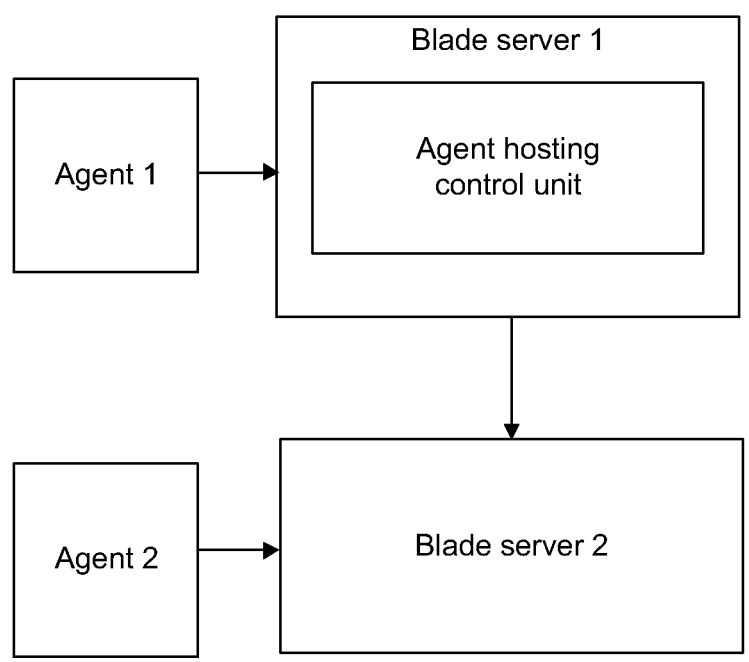
FIG. 3 is a system architecture on which embodiment 1 is based according to the disclosure.

Embodiment 1: the embodiment is based on a system architecture as shown in FIG. 3, there are two blade servers, and two agents get registered and log in to different blade servers respectively, a call between agents is an inter-agent cross-blade-server call. The implementation process of a specific inter-agent cross-blade-server call according to the embodiment includes the following:

firstly, agent 1 gets registered and logs in to blade server 1 while agent 2 gets registered and logs in to blade server 2, the agent 1 initiates a call request to call the agent 2. It should be noted herein that all call requests can arrive at objects requested to be called only if the call requests are switched by a blade server;

since the two agents are not at a same blade server, a session message cannot be formed between both of them, therefore, after receiving a call request message initiated by the agent 1 that logs in to the blade server 1, the blade server 1, serving as a server of a call initiator, needs to indicate the blade server 2 to temporarily hand over the agent 2 to the blade server 1 to host the agent 2, and transfer, through a message, related registration and login information of the agent 2 to an agent hosting control unit of the blade server 1. Thus the blade server 1, serving as a server of a call initiator, implements information unification within the server, with related registration and login information of the agent 1 and the agent 2 stored therein, such as agent state information;

secondly, after the agent 2 is hosted by the blade server 1, the hosted called agent 2' will appear at the blade server 1, in this way, a call session can be generated between the agent 1 and the hosted agent 2', in the meantime, an operation of calling the hosted agent 2' by the agent 1 is initiated at the blade server 1, but since an SIP link of the agent 2 is registered with the blade server 2, it is desired to initiate SIP signaling through the blade server 1 to correlate the call to the blade server 2, then call services at the blade server 2 will receive a new call which will be directed to an SIP terminal of the agent 2.

To sum up, without affecting call functionality and process of an existing call system, embodiments of the disclosure add a cross-blade-server cloud call control system to an existing call centre according to existing cloud call techniques, and the cross-blade-server cloud call control system includes actually multiple blade servers in which an agent hosting control unit is arranged, thus problems existing in an inter-agent cross-blade-server call according to the prior art can be solved through hosting of a called agent implemented at a blade server of an initiator of a call request. By means of embodiments of the disclosure, a problem, i.e., how to implement a call in the case that multiple agents logging in to different blade servers have a cross-blade-server session with each other during a call using cloud call techniques, can be well solved, that is to say, any cross-blade-server call can be implemented, an agent can get registered with any blade server, but a call between multiple agents is not affected by the cross-blade-server call, thus implementing perfectly any inter-agent cross-blade-server call and making the call cloud-enabled. The call has nothing to do with hardware, therefore it is not affected by software even though a blade server is anomaly only if call-related information is transferred to other blade servers which are normal, therefore the all is not affected even though a blade server is anomaly. Expansibility of software is improved such that the theoretical upper limit of Call Attempts Per Second (CAPS) tends to be infinite, and performance of a call is also improved.

What described are merely preferable embodiments of the disclosure, and are not intended to limit the disclosure.

INDUSTRIAL APPLICABILITY

In embodiments of the disclosure, information of an agent initiating a call and that of a called agent can be united in a same server through hosting the called agent at a source blade server where the agent initiating the call get registered and logs in, thus information sharing can be implemented. Therefore, By virtue of the disclosure, a complete inter-agent call can be rapidly and cooperatively performed in the case of cross-blade-servers.

What is claimed is:

1. An inter-agent cross-blade-server calling method, comprising:
   receiving, by a source blade server, to which an agent initiating a call gets registered or logs in to, a call request message from an agent initiating a call;
   parsing, by the source blade server, the call request message to determine that the call request message is a message to be transmitted to a target blade server, which a called agent gets registered or log in to;
   wherein the target blade server and the source blade server are different blade servers;
   transmitting, by the source blade server, an information acquisition request message to the target blade server to request acquisition of a related registration and login information of the called agent at the target blade server;
   receiving, by the source blade server, from the target blade server, the related registration and login information according to the information acquisition request message;
   saving, by the source blade server, the related registration and login information of the called agent; and
   generating, by the source blade server, a session at the source blade server between the agent initiating a call and the called agent according to the related registration and login information of both the called agent and the agent initiating the call.

2. The method according to claim 1, wherein the generating at the source blade server a session between the agent initiating a call and the called agent comprises: requesting, by the source blade server, the target blade server to modify a state of the called agent at the target blade server to a hosted state.

3. The method according to claim 1, wherein the generating at the source blade server a session between the agent initiating a call and the called agent further comprises: initiating, by the source blade server, Session Initiation Protocol (SIP) signaling to correlate the session to the target blade server which then directs the session to an SIP terminal of the called agent.

4. An inter-agent cross-blade-server calling system, comprising: a plurality of blade servers: an agent initiating a call gets registered or logs in to a source blade server; a called agent gets registered or logs in to a target blade server;
   wherein the target blade server and the source blade server are different blade servers, and
   wherein
   the source blade server, is configured to,
      receive a call request message from an agent initiating a call; parse the call request message to determine that the call request message is a message to be transmitted to the target blade server;
      transmit an information acquisition request message to the target blade server to request acquisition of a related registration and login information of the called agent at the target blade server;
      receive, from the target blade server, the related registration and login information according to the information acquisition request message;
      save, by the source blade server, the related registration and login information of the called agent; and
      generate a session, at the source blade server, between the agent initiating a call and the called agent according to the related registration and login information of both the called agent and the agent initiating the call.

5. The system according to claim 4, wherein the source blade server is further configured to request the target blade server to modify a state of the called agent at the target blade server to a hosted state.

6. The system according to claim 4, wherein the source blade server is further configured to initiate Session Initiation Protocol (SIP) signaling to correlate the session to the target blade server which then directs the session to an SIP terminal of the called agent.

* * * * *